(No Model.)
G. G. LINEN.
SCALE SCOOP.
No. 540,396. Patented June 4, 1895.
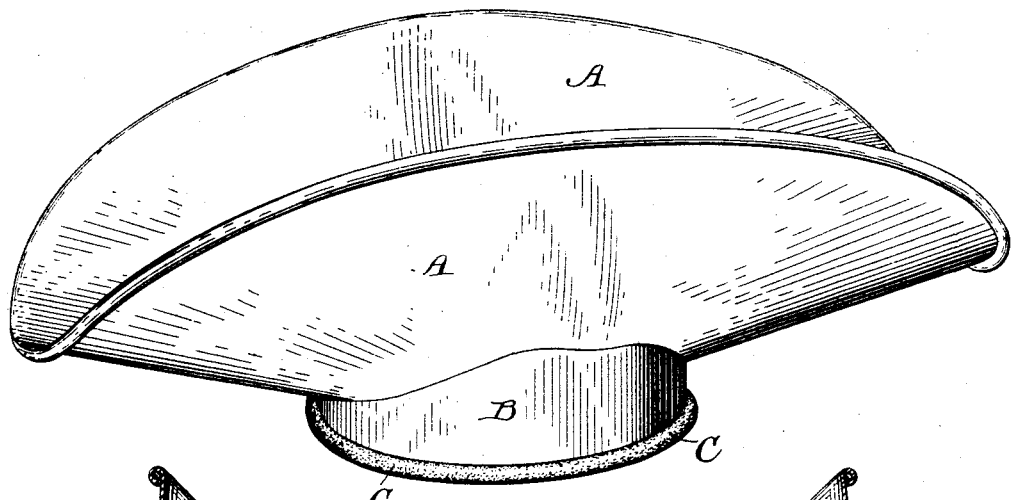
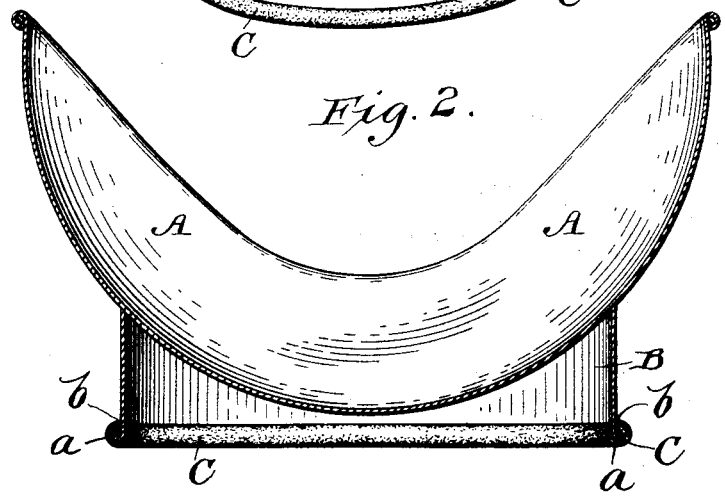
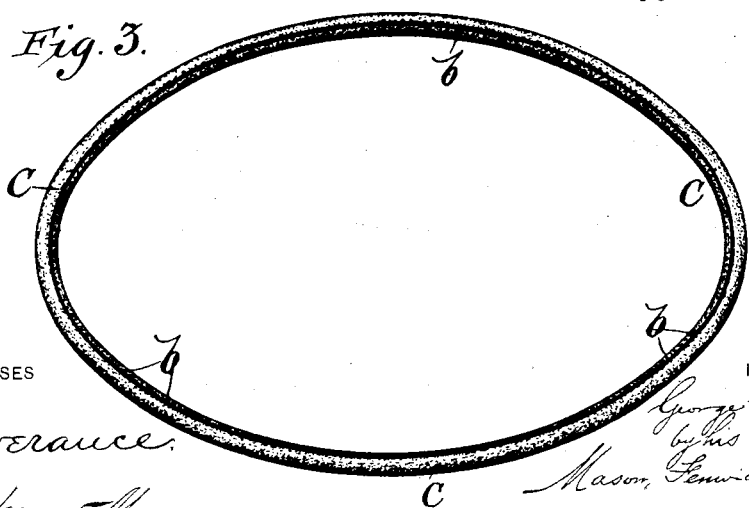
WITNESSES
INVENTOR
George G. Linen
by his Attorney
Mason, Fenwick & Lawrence

UNITED STATES PATENT OFFICE.

GEORGE G. LINEN, OF BUFFALO, NEW YORK.

SCALE-SCOOP.

SPECIFICATION forming part of Letters Patent No. 540,396, dated June 4, 1895.

Application filed February 2, 1895. Serial No. 537,102. (No model.)

*To all whom it may concern:*

Be it known that I, GEORGE G. LINEN, a citizen of the United States, residing at Buffalo, in the county of Erie and State of New York, have invented certain new and useful Improvements in Scale-Scoops; and I do hereby declare the following to be a full, clear, and exact description of the invention, such as will enable others skilled in the art to which it appertains to make and use the same.

My invention relates to an improvement in weighing scale scoops, and its object is to prevent the marring of the counter or platform of the scale, by an abrading contact of the bottom ring or collar therewith.

My invention consists in providing a bead at the bottom of the ring collar of a scale scoop and applying a hollow obliquely or tangentially slitted rubber cushion and protection ring upon the lower edge of the ring collar, and around the bead, all in such manner, that the rubber cushion and protection ring is held in position against upward or downward movement, so as not to become detached, and at the same time form an annular cushion below the rim or collar, which will prevent a metal contact between the scale scoop, and the scale platform, or counter, and thus effectually prevent scratching or rubbing, as when a metallic edge comes in contact with the platform.

The result produced by my invention is a very important one, as, in fitting up stores with scales and platforms or counters, great expense is incurred in order to secure beauty or ornamentation; and when the platform or counter becomes scratched or marred by contact of the bottom of the scoop therewith, considerable loss is incurred, or annoyance caused at sight of the same to the proprietor of the establishment.

In the accompanying drawings, Figure 1 is a perspective view of a scale-scoop provided with my improved rubber protection-ring cushion. Fig. 2 is a vertical cross-section of the same. Fig. 3 is a detail view in perspective of the elastic-ring cushion.

A in the drawings represents the scoop, and B the bottom rim of ring form, and having a bead *a* turned outward all around its lower edge.

C is a rubber ring, made hollow and provided with a slit *b* in one of its sides which extends entirely around the ring, and communicates with its hollow interior as shown in the drawings. It is important to observe that the slit in the ring is cut obliquely or tangentially to the bore of the rubber ring, as by this construction the rubber ring fits the inner, vertical, unbeaded surface of the outer beaded rim B, in a snug and proper manner, and at the same time takes a firm hold upon the outer bead of the rim, so that it cannot become detached accidentally. My invention does not require a bead to be formed on the tube itself, in order to give it sufficient spring force, it being simply a plain surfaced tube of rubber, circular in cross section, and with a slit extending entirely around it, and said slit being tangential to the bore of the tube. This ring is passed over the beaded edge of the rim B, by inserting said edge into the slit *b* and forcing the ring upon said edge until the edge comes in contact with the inner surface of the bore or hollow chamber of the rubber ring. Thus applied, the rubber ring remains in position without any other fastening, and, when in position, it forms an elastic or yielding protection cushion for the scoop, and when the scoop is placed upon a counter or platform, the sound from contact is deadened, and all abrasion of the parts is avoided.

The bead *a*, as represented, being on the outside of the rim B, the slit *b* is cut in the tube tangentially in order to secure a perfectly solid fit upon the lower end of the rim.

The best material out of which to manufacture the ring is vulcanized india rubber.

What I claim as my invention is—

1. A scale scoop having a beaded supporting rim on its under side and a rubber ring or cushion constructed with a slit around it which is oblique or tangential to the bore of the rubber ring, and applied on the lower edge of the rim and held in position by means of the bead, substantially as described.

2. An annular rubber ring, made hollow and provided with a slit oblique or tangential to the bore of the rubber ring, in one of its sides and extending all around and in communication with the bore or annular chamber of the ring, for use upon the beaded annular rim of a scale scoop, substantially as described.

In testimony whereof I hereunto affix my signature in presence of two witnesses.

GEORGE G. LINEN.

Witnesses:
 THEO. L. RICHMOND,
 FRANK A. AVERY.